(12) United States Patent
Krekel et al.

(10) Patent No.: US 12,304,460 B2
(45) Date of Patent: May 20, 2025

(54) METHOD FOR PREVENTING UNWANTED DEACTIVATION OF ACTIVE PARKING ASSISTANCE SYSTEM

(71) Applicant: FORD GLOBAL TECHNOLOGIES, LLC, Dearborn, MI (US)

(72) Inventors: Markus Krekel, Wermelskirchen (DE); Andrew Ochmanski, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 262 days.

(21) Appl. No.: 18/100,624

(22) Filed: Jan. 24, 2023

(65) Prior Publication Data

US 2023/0303062 A1    Sep. 28, 2023

(30) Foreign Application Priority Data

Mar. 22, 2022 (DE) .......................... 102022106606.1

(51) Int. Cl.
*B60W 30/06* (2006.01)
*B60W 50/12* (2012.01)

(52) U.S. Cl.
CPC ............ *B60W 30/06* (2013.01); *B60W 50/12* (2013.01); *B60W 2540/18* (2013.01); *B60W 2540/229* (2020.02)

(58) Field of Classification Search
CPC ................. B60W 30/06; B60W 50/12; B60W 2540/229; B60W 2540/18
USPC .......................................................... 701/41
See application file for complete search history.

(56) References Cited

U.S. PATENT DOCUMENTS

| 7,363,136 | B2* | 4/2008 | Kumaido | ............. | B62D 5/0481 |
| | | | | | 180/443 |
| 11,247,668 | B2* | 2/2022 | Harai | .................... | B60W 50/14 |
| 11,738,800 | B2* | 8/2023 | Narasimhan | ........... | B62D 3/126 |
| | | | | | 701/41 |
| 2007/0288142 | A1* | 12/2007 | Maeda | .................. | B62D 1/286 |
| | | | | | 701/41 |

(Continued)

FOREIGN PATENT DOCUMENTS

| CN | 105398431 A | * | 3/2016 | ................ | B60T 7/12 |
| CN | 105416391 A | * | 3/2016 | ............. | B62D 1/286 |

(Continued)

*Primary Examiner* — Kurt Philip Liethen
*Assistant Examiner* — John D Bailey
(74) *Attorney, Agent, or Firm* — Frank L. Lollo; MacMillan, Sobanski & Todd, LLC (57) ABSTRACT

During an autonomous or semiautonomous parking maneuver, a driver may typically exert manual control on the steering wheel and the autonomous maneuver will be automatically deactivated. The invention provides a method preventing unwanted deactivation of an active parking assistance system which has occurred in the prior art. During the parking maneuver, a check is made to detect the presence of a deactivation prevention event, and if a deactivation prevention event is present then either an increase is applied to a threshold torque above which the active parking assistance system is deactivated or the automatic deactivation is fully prevented. The presence of the deactivation prevention event may be checked based on a vehicle inclination, a steering angle, or a presence of a curb adjacent the vehicle.

16 Claims, 3 Drawing Sheets

(56) References Cited

U.S. PATENT DOCUMENTS

| | | | |
|---|---|---|---|
| 2011/0080304 A1* | 4/2011 | Toledo | G08G 1/165 701/41 |
| 2013/0066523 A1* | 3/2013 | Iwamoto | B62D 5/0493 701/41 |
| 2015/0307130 A1* | 10/2015 | Kimura | B62D 15/025 701/41 |
| 2015/0329141 A1* | 11/2015 | Preijert | B62D 6/008 701/41 |
| 2015/0344066 A1* | 12/2015 | Tsubaki | G05D 1/0061 701/41 |
| 2017/0074189 A1* | 3/2017 | Oda | F02N 11/0822 |
| 2018/0111608 A1* | 4/2018 | Kim | B60W 50/14 |
| 2018/0118197 A1* | 5/2018 | Kim | B60W 40/076 |
| 2020/0023833 A1* | 1/2020 | Martin | B60W 30/06 |
| 2021/0009197 A1* | 1/2021 | Kim | B60W 10/20 |
| 2021/0024075 A1* | 1/2021 | Eigel | B60W 40/08 |
| 2021/0155207 A1* | 5/2021 | Uehara | B60T 17/22 |
| 2021/0179076 A1* | 6/2021 | Nakada | G06V 20/58 |
| 2021/0291811 A1* | 9/2021 | Otake | B60W 10/20 |
| 2021/0300337 A1* | 9/2021 | Fujitani | G08G 1/143 |
| 2021/0323571 A1* | 10/2021 | Baehrle-Miller | B60W 60/001 |
| 2022/0063600 A1* | 3/2022 | Inoue | B60W 40/105 |
| 2022/0097533 A1* | 3/2022 | Treharne | B60W 30/17 |
| 2023/0001938 A1* | 1/2023 | Lee | B60W 50/029 |
| 2023/0098006 A1* | 3/2023 | Park | G07C 5/0841 726/28 |
| 2023/0150570 A1* | 5/2023 | Wang | B60R 16/027 701/41 |

FOREIGN PATENT DOCUMENTS

| | | | | |
|---|---|---|---|---|
| CN | 106608258 A | * | 5/2017 | ............ B60W 10/20 |
| CN | 107856621 A | * | 3/2018 | ............ B60W 10/04 |
| DE | 102007039332 A1 | | 2/2008 | |
| DE | 102008042277 A1 | | 4/2010 | |

* cited by examiner

METHOD FOR PREVENTING UNWANTED DEACTIVATION OF ACTIVE PARKING ASSISTANCE SYSTEM

CROSS REFERENCE TO RELATED APPLICATIONS

This application claims priority to application DE102022106606.1, filed in the German Patent and Trademark Office on Mar. 22, 2022, which is incorporated herein by reference in its entirety.

STATEMENT REGARDING FEDERALLY SPONSORED RESEARCH

Not Applicable.

BACKGROUND OF THE INVENTION

The invention relates to a method for preventing unwanted deactivation of an active parking assistance system of a vehicle, a method for actively assisting a parking operation of a vehicle, an active parking assistance system, a vehicle comprising an active parking assistance system, and a computer program therefor.

An active parking assistance system is a driver assistance system with which a vehicle parking or unparking operation (parking maneuver) can be performed partially autonomously or fully autonomously. For this purpose, the active parking assistance system can intervene in the steering system and can accelerate and/or brake the vehicle, and, if necessary, change gear in order to follow a calculated movement path for parking into or unparking from a parking space.

Typically, an active parking assistance system aborts a parking maneuver if a torque acting on a steering handle of the vehicle (e.g., a steering wheel) is detected, because it is then assumed that the driver has contacted the steering handle with at least one hand (hands-on-steering-wheel scenario) and wants to perform manual steering movements, for example to react to a suddenly appearing obstacle.

A torque sensor can be used to detect the torque acting on the steering handle, for example as described in DE102008042277A1. The sensor signal from the torque sensor can be processed using a machine learning algorithm to determine whether a hands-on-steering-wheel scenario is present.

Also known from DE102007039332A1 is a method for detecting the contact state of at least one hand of a driver on the steering handle of a vehicle, in which method a steering movement of the steering handle is detected by means of at least one torque sensor and at least one angle sensor.

In addition, US2021/0024075A1 discloses a method for identifying hands-off situations, i.e., situations in which a hands-on-steering-wheel scenario is not currently present, by machine learning based on steering torque data and distance data from a driver's hands to the steering wheel.

In some cases, however, a hands-on-steering-wheel scenario may be incorrectly detected, e.g., it is determined that the driver contacts the steering handle with at least one hand, although this is not actually the case. Two typical cases in which such a false detection can occur are described below.

Case 1:

When parking a vehicle on downhill or uphill terrain, many drivers steer the vehicle wheels to the left or right, for example toward a curb, to make it more difficult for the vehicle to roll forward or backward when parked. This turning in can create a "tension" in the steering system, which is detected as a torque acting on the steering handle when the vehicle is started. If the driver then wishes to use the active parking assistance system to pull out of the parking space, the remaining torque in the steering system may falsely trigger the detection of a hands-on-steering-wheel scenario, thus preventing the use of the active parking assistance system.

Case 2:

If the vehicle speed is close to an upper limit speed up to which the use of the active parking assistance system is enabled, the steering system must move the steering handle very quickly in order to follow a movement path calculated by the active parking assistance system. In some cases, a rapid change of steering direction may be required. In this case, the inertia of the steering handle may cause a torque that incorrectly triggers the detection of a hands-on-steering-wheel scenario. Similarly, parking on an uneven surface, for example a surface with potholes and/or bumps, may cause high inertia-induced torques and incorrect detection of a hands-on-steering-wheel scenario when parking or unparking.

SUMMARY OF THE INVENTION

Against this background, it is an object of the present invention to provide possible ways by which unwanted deactivation of an active parking assistance system can be avoided.

A basic feature of the invention is to determine whether a torque acting on a steering handle of a vehicle is caused by a driver of the vehicle or otherwise. Automatic deactivation of the active parking assistance system is to be avoided or at least made more difficult if the torque acting on the steering handle is not caused by the driver.

A first aspect of the invention relates to a method (e.g., computer implemented) for preventing unwanted deactivation of an active parking assistance system of a vehicle. The method comprises the following method steps: checking whether the active parking assistance system of the vehicle is activated; if the active parking assistance system of the vehicle is activated, checking the presence of a deactivation prevention event; and, if a deactivation prevention event is present, increasing a threshold torque of a steering handle of the vehicle above which the active parking assistance system is deactivated or preventing automatic deactivation of the active parking assistance system.

A computer-implemented method means that at least one method step, preferably several or all method steps, are carried out using a computer program.

The proposed method can prevent unwanted deactivation of the active parking assistance system either exclusively during a parking operation, exclusively during an unparking operation, or both during a parking operation and an unparking operation. The terms parking operation and unparking operation refer here to the parking and unparking, respectively, of a vehicle, e.g., a passenger car, into and out from a parking space, respectively. The term parking maneuver refers to either a parking operation or an unparking operation. The parking space can be a longitudinal parking space, a transverse parking space or an angled parking space, for example.

The active parking assistance system can be designed in such a way that it can be activated or is activated by a driver of the vehicle, for example, by actuating a button, by voice input, etc. Alternatively or additionally, the active parking assistance system can be designed in such a way that it can be activated or is activated automatically based on a trigger signal, e.g., after the vehicle engine has been started when a parking maneuver has previously been carried out, on arrival at a destination, etc.

As explained at the outset, the active parking assistance system is set up and designed to perform a parking operation semi-autonomously or fully autonomously. Typically, the active parking assistance system is automatically deactivated if a torque that is greater than a predetermined threshold torque is exerted on the steering handle of the vehicle. The threshold torque can, for example, be defined in such a way that it corresponds to a torque that is exerted on the steering handle if the driver contacts the steering handle with at least one hand and exerts a force on the steering handle voluntarily or involuntarily. As a rule, this is intended to ensure that the active parking assistance system is deactivated as soon as the driver contacts the steering handle with at least one hand Thus, the predetermined threshold torque has an initial value corresponding to a torque resulting from a hand of a driver holding the steering handle.

If a target torque is already acting on the steering handle, for example to align the wheels of the vehicle to complete a movement path to perform the parking operation, the threshold torque leads to a corresponding deviation of the actual torque from the target torque.

In a first method step of the proposed method, it is checked whether the active parking assistance system is activated. This method step may comprise, for example, checking whether the engine of the vehicle changes from a deactivated state to an activated state. If the active parking assistance system is activated, a subsequent method step checks whether a deactivation prevention event is present.

A deactivation prevention event is understood to be an event in the presence of which the deactivation of the active parking assistance system, which is normally provided for, is not carried out at all or only under modified conditions. The deactivation prevention event can in particular result in a torque acting on a steering handle of the vehicle without the driver contacting the steering handle, for example due to stresses in the steering system and/or the moment of inertia of the steering handle.

Accordingly, in a further method step, it is provided that if a deactivation prevention event is present, the threshold torque above which the active parking assistance system is normally deactivated is increased or the automatic deactivation of the active parking assistance system is prevented. Preventing automatic deactivation of the active parking assistance system can be achieved, for example, by increasing the threshold torque to values that are not achievable in actual terms or by deactivating the deactivation function, e.g., by deactivating monitoring of the torque acting on the steering handle.

It may also be provided that, depending on the type of deactivation prevention event present, either the threshold torque is increased or automatic deactivation is prevented.

Increasing the threshold torque or preventing automatic deactivation can preferably take place for a limited time, for example for a predetermined period of time or until the active parking assistance system is activated again.

The proposed measures ensure that, in the presence of a torque not caused by the driver and acting on the steering handle, the active parking assistance system is only deactivated when an increased threshold torque is exceeded or is not even deactivated at all. In this way, unwanted deactivation of an active parking assistance system can be avoided. Consequently, the active parking assistance system can be used more frequently and the benefits of the active parking assistance system can be realized more frequently. User acceptance of such a driver assistance system can be increased.

According to different embodiments, the presence of the deactivation prevention event may be checked based on a vehicle inclination, a steering angle, and the presence of a curb, for example.

The vehicle inclination can be determined using sensor signals from an inclination sensor of the vehicle. Alternatively or additionally, the position of the vehicle can be determined, e.g., by means of a global navigation satellite system, and the associated road inclination and thus inclination of the vehicle can be determined for the determined vehicle position, e.g., using map material, databases, etc. with position-dependent road inclination data.

The presence of a curb can also be determined based on a vehicle sensor signal and/or based on a position of the vehicle.

In other words, the presence or absence of a curb can be determined based on sensor signals from one or more vehicle sensors, e.g., camera sensors, radar sensors, lidar sensors, or ultrasonic sensors. Alternatively or additionally, the position of the vehicle can be determined, e.g., by means of a global navigation satellite system, and the determined vehicle position can then be checked to determine whether or not a curb is present at this position, e.g., using map material, databases, etc. with curbs noted as a function of position.

The steering angle of the vehicle can be checked to determine whether the wheels of the vehicle are steered in the direction of the curb, i.e., whether they are not aligned substantially parallel to the curb. A steering angle can be specified here from which the wheels are to be considered steered in.

By checking the presence of a deactivation prevention event based on a vehicle inclination, a steering angle, and a presence of a curb, it is possible to prevent unwanted deactivation of the active parking assistance system in the Case 1 described above.

According to further embodiments, checking for the presence of a deactivation prevention event can comprise continuous checking of an actual torque acting on the steering handle of the vehicle from activation of the active parking assistance system. The presence of a deactivation prevention event is only determined here if an actual torque acting on the steering handle of the vehicle has been continuously detected since the active parking assistance system was activated.

Optionally, the continuous checking of the actual torque acting on the steering handle can be performed not only from the time the active parking assistance system is activated, but also from the time the engine or drivetrain of the vehicle changes from a deactivated state to an activated state. In this case, the presence of a deactivation prevention event is only determined (i.e., checked) if an actual torque acting on the steering handle of the vehicle has been continuously detected since the time at which the engine of the vehicle changes from a deactivated state to an activated state.

Continuous detection of an actual torque acting on the steering handle of the vehicle means that a torque is present in a predetermined range without interruption since the active parking assistance system was activated or since the time at which the engine of the vehicle changed from a deactivated state to an activated state. The predetermined range can, for example, be selected to be so narrow that a substantially equally high actual torque must be present in order to fulfill the stated condition.

By detecting the presence of a deactivation prevention event and consequently causing an increase in the threshold torque of the steering handle of the vehicle, or by preventing the automatic deactivation of the active parking assistance system in each case only if an actual torque has been continuously acting on the steering handle since the active parking assistance system was activated, the operation of the vehicle can be improved, since the detection of the presence of a deactivation prevention event can be performed with greater reliability. In other words, the probability of a false-positive detection of the presence of a deactivation prevention event can be reduced.

According to further embodiments, checking for the presence of a deactivation prevention event may comprise determining an actual torque acting on the steering handle of the vehicle. The presence of the deactivation prevention event is checked here based on a moment of inertia of the steering handle, a target torque acting on the steering handle, and the determined actual torque.

The actual torque can be determined by means of methods known from the prior art, for example using a torque sensor coupled to the steering handle.

The target torque is a predetermined or specified torque that must act on the steering handle without taking into account the inertia of the steering handle in order, for example, to be able to complete a specified movement path for parking or unparking.

The moment of inertia of the steering handle is the moment caused by the inertia of the steering handle, counteracting the actual torque. To compensate for the moment of inertia of the steering handle, the applied actual torque must be correspondingly higher so that the target torque is achieved.

The presence of a deactivation prevention event can now be positively checked as long as the actual torque exceeds the target torque only by the value of the moment of inertia. In other words, exceeding the target torque does not lead to an automatic deactivation of the active parking assistance system as long as the exceeding is justified by the moment of inertia of the steering handle.

By checking the presence of the deactivation prevention event based on a moment of inertia of the steering handle, a target torque acting on the steering handle, and the determined actual torque, it is possible to prevent unwanted deactivation of the active parking assistance system in Case 2 described above.

According to further embodiments, the method may comprise checking whether the attention of a driver of the vehicle is sufficient, and if the attention of the driver of the vehicle is not sufficient, preventing the increase of the threshold torque of the steering handle above which the active parking assistance system is deactivated, or preventing the automatic deactivation of the active parking assistance system.

In other words, the proposed method for preventing unwanted deactivation of an active parking assistance system can be carried out under the condition that the driver's attention is sufficiently high. For checking whether the driver's attention is sufficiently high, for example, camera sensors of the vehicle can be used, with which, for example, the driver's eye movement is determined and from this a correspondence of the driver's attention with the parking maneuver is determined.

By preventing the threshold torque from being increased or the active parking assistance system from being automatically deactivated if the driver's attention is insufficient, operation can be improved.

Another aspect of the invention relates to a computer-implemented method for actively assisting a parking operation of a vehicle. The method comprises the following method steps: checking whether an active parking assistance system of the vehicle is activated; if the active parking assistance system of the vehicle is activated, actively assisting the parking operation; during the active assistance of the parking operation, determining an actual torque acting on a steering handle of the vehicle; checking whether the actual torque exceeds a predetermined threshold torque; if the actual torque exceeds the threshold torque, canceling the active assistance of the parking operation; and, if the actual torque does not exceed the threshold torque, continuing the active assistance of the parking operation. Here, the active assistance of the parking operation comprises carrying out one of the above-described methods for preventing unwanted deactivation of an active parking assistance system of a vehicle.

In other words, the threshold torque is increased or the cancellation of the active assistance of the parking operation is prevented if a deactivation prevention event is present.

The above explanations of the methods for preventing unwanted deactivation of an active parking assistance system therefore also serve to describe the method for actively assisting a parking operation of a vehicle. The advantages of the methods for preventing unwanted deactivation of an active parking assistance system of a vehicle are correspondingly associated with the method for actively assisting a parking operation of a vehicle.

Another aspect of the invention relates to an active parking assistance system comprising means suitable for carrying out the steps of a method according to the above description.

Therefore, the above explanations of the methods also serve to describe the proposed active parking assistance system. The advantages of the methods are correspondingly associated with the active parking assistance system.

The active parking assistance system may have appropriately set up and designed devices for carrying out the individual method steps, such as:
- a processing unit set up and designed to check whether the active parking assistance system of the vehicle is activated and to check whether a deactivation prevention event is present,
- a control unit set up and designed to increase a threshold torque of a steering handle of the vehicle above which the active parking assistance system is deactivated or to prevent automatic deactivation of the active parking assistance system,
- a memory unit, set up and designed for storing torque values for the threshold torque, and
- one or more sensors, such as torque sensors, camera sensors, radar sensors, lidar sensors, ultrasonic sensors.

The devices of the active parking assistance system can be operatively connected to one another for signal exchange and can optionally fulfill other typical functions of an active parking assistance system. The control unit can be implemented in terms of hardware and/or software and can be physically formed in one or more parts. The control unit can be part of or integrated into an engine control system.

Another aspect of the invention relates to a vehicle having an active parking assistance system as described above.

Therefore, the above explanations of the active parking assistance system also serve to describe the vehicle according to the invention. The advantages of the active parking assistance system are correspondingly associated with the vehicle.

The vehicle has a steering handle, which can be designed as a steering wheel, for example.

Another aspect of the invention relates to a computer program comprising instructions for causing an active parking assistance system or vehicle as described above to carry out any of the methods described above.

A computer program can be understood as a program code that can be stored on a suitable medium and/or retrieved via a suitable medium. Any medium suitable for storing software, for example a non-volatile memory installed in a control unit, a DVD, a USB stick, a flash card or the like, can be used to store the program code. The program code can be retrieved via the Internet or an intranet, for example, or via another suitable wireless or wired network.

BRIEF DESCRIPTION OF THE DRAWINGS

The invention will be explained in greater detail below with reference to the figures and the accompanying description. In the figures.

DETAILED DESCRIPTION OF PREFERRED EMBODIMENTS

Figure 1:
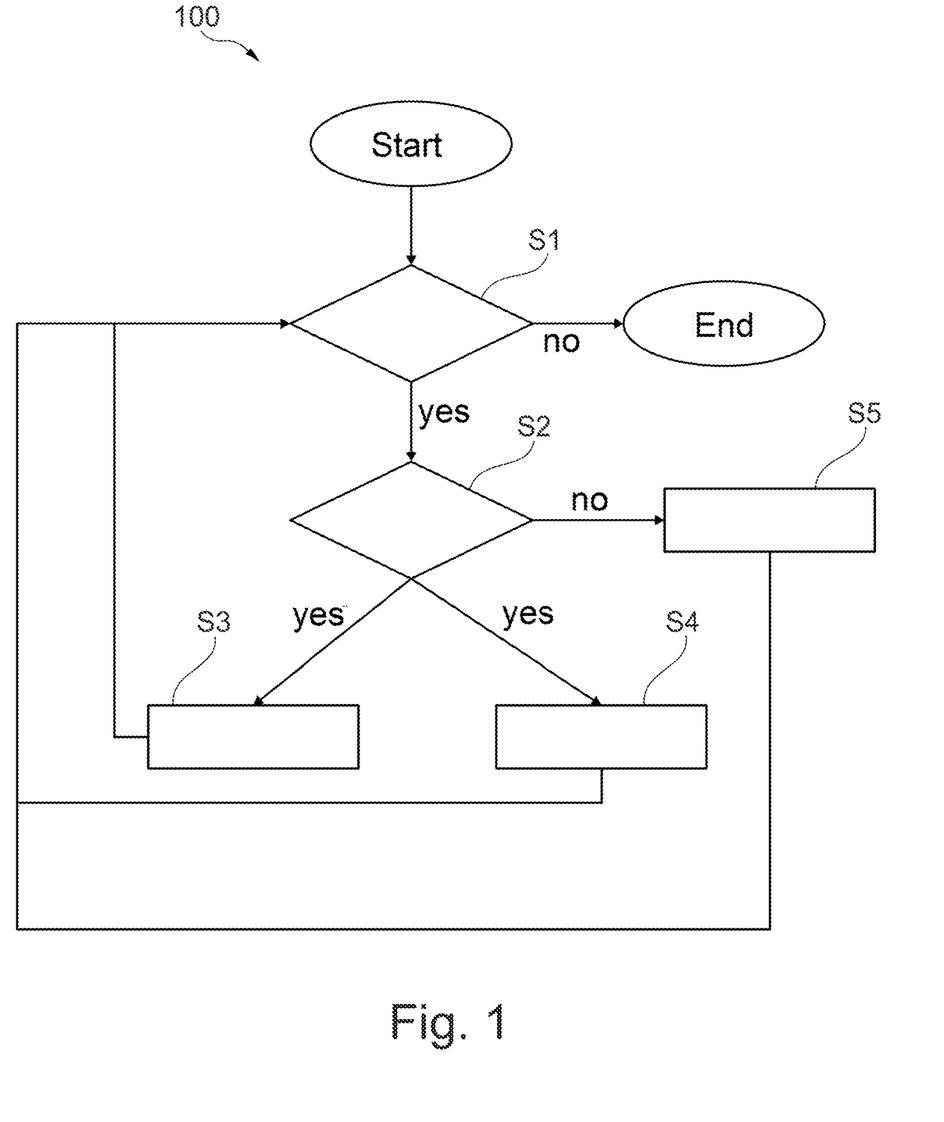
FIG. 1 shows a flow chart of an exemplary method for preventing unwanted deactivation of an active parking assistance system.

In FIG. 1, the sequence of an exemplary method 100 for preventing unwanted deactivation of an active parking assistance system 1 of a vehicle 300 (FIG. 3) is schematically illustrated.

After the start of the method 100, a first method step S1 checks whether the active parking assistance system 1 is activated. If this is not the case, the method 100 is terminated. Otherwise, the method continues to method step S2.

In method step S2, it is checked whether a deactivation prevention event is present.

Method step S2 will be explained in greater detail below with reference to two specific exemplary embodiments. A first exemplary embodiment relates to an actively assisted parking operation in which the active parking assistance system 1 is activated when the engine of the vehicle 300 is activated.

In the first exemplary embodiment, the presence of the deactivation prevention event is checked based on a vehicle inclination, a steering angle, and/or the presence of a curb.

For this purpose, the steering angle of the steering handle 2 (FIG. 3) is determined by means of suitable sensors. In addition, real-time data or recorded data, for example based on sensor signals of the vehicle sensors or based on a position of the vehicle 300 and database or map data, is used to determine whether a curb is present at the parking position of the vehicle 300. In addition, the vehicle inclination is determined based on a sensor signal of an inclination sensor of the vehicle 300 or also in a data-based based manner with reference to the position of the vehicle 300.

Lastly, the actual torque 9 acting on the steering handle 2 is continuously checked from the time the active parking assistance system 1 is activated, for example using a sensor signal from a torque sensor 6 that is operatively connected to the steering handle 2.

The presence of a deactivation prevention event is positively determined in the first exemplary embodiment if an actual torque 9 acting on the steering handle 2 of the vehicle 300 has been continuously detected since the active parking assistance system 1 was activated, a curb is present, a steering angle is detected such that it can be assumed that the vehicle wheels are turning in the direction of the curb, and the vehicle 300 is parked on an inclined road surface. If all the above conditions are met, it can be assumed that the actual torque 9 acting on the steering handle 2 is not caused by the driver but by stresses in the steering system of the vehicle 300 caused by the parking situation. Consequently, a deactivation prevention event is present, i.e., an automatic deactivation of the active parking assistance system 1 should be made more difficult or prevented.

A second exemplary embodiment relates to an actively assisted parking operation in which the active parking assistance system 1 is activated by a driver of the vehicle 300 actuating a button. For the parking operation, a movement path to be completed for the vehicle 300 has been determined, which provides for abrupt changes in the steering direction. An analogous operation can be provided in the event that abrupt changes in the steering direction are caused by an uneven road surface.

To check whether a deactivation prevention event is present, the actual torque 9 acting on the steering handle 2 of the vehicle 300 is detected, for example by means of a sensor signal from a torque sensor 6 that is operatively connected to the steering handle 2. In addition, the moment of inertia 11 of the steering handle 2 and the target torque 12 to be applied to the steering handle 2 to complete the determined movement path are determined. It is then determined whether a deviation of the actual torque 9 from the target torque 12 is caused by the moment of inertia 10. If this is the case, a deactivation prevention event is present, i.e., automatic deactivation of the active parking assistance system 1 should be made more difficult or prevented.

If it is determined in method step S2 that no deactivation prevention event is present, the threshold torque 10 of the steering handle 2 of the vehicle 300 above which the active parking assistance system 1 would be deactivated is maintained in method step S5. Subsequently, the method 100 may be continued or terminated with method step S1.

If, on the other hand, it is determined in method step S2 that a deactivation prevention event is present, the method 100 is continued either with method step S3 or method step S4. In this case, it can already be specified initially that the method 100 is continued in any case with method step S3 or in any case with method step S4, or it can be specified that, depending on the specific deactivation prevention event, the method 100 is continued either with method step S3 or method step S4.

Figure 3:
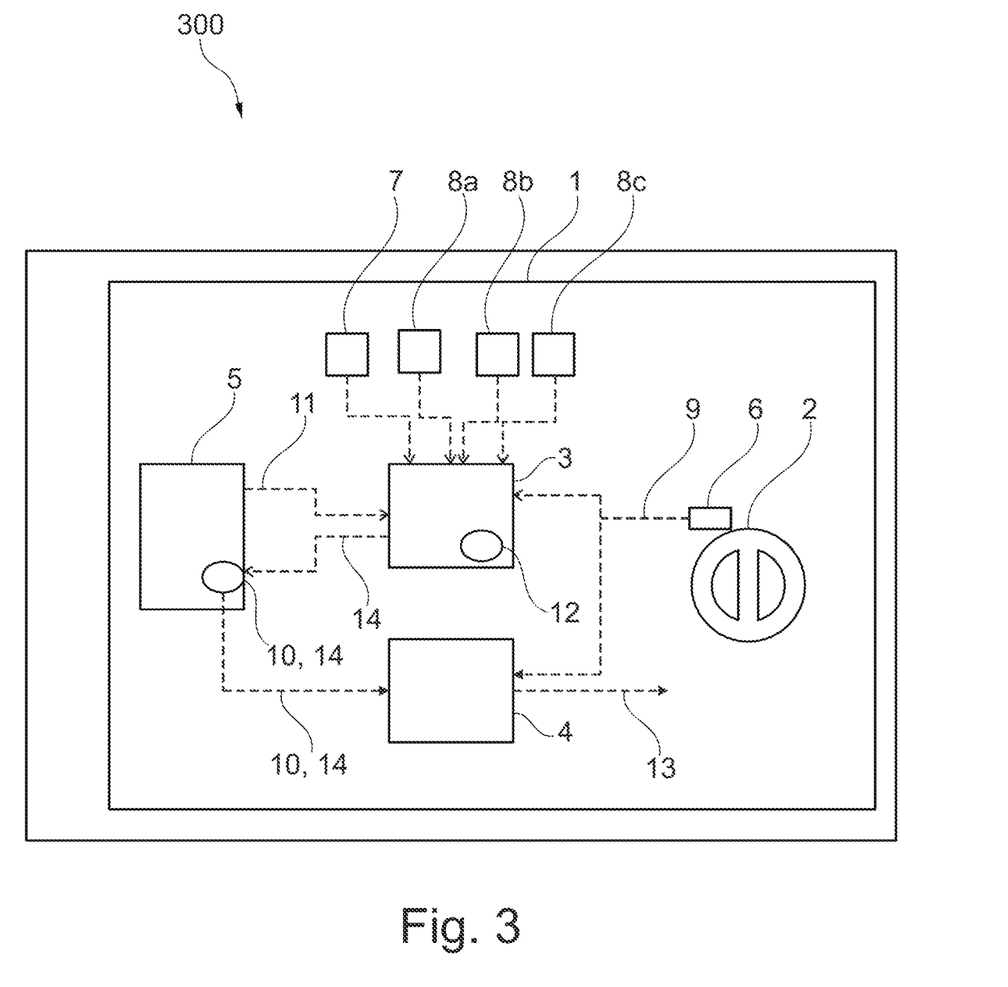
FIG. 3 shows a schematic representation of an exemplary vehicle.

In method step S3, the threshold torque 10 of the steering handle 2 of the vehicle 300, above which the active parking assistance system 1 is deactivated, is increased until the active parking assistance system 1 is reactivated. In other words, the threshold torque 10 is replaced by an increased threshold torque 14 (FIG. 3).

In method step S4, the automatic deactivation of the active parking assistance system 1 is prevented until the active parking assistance system 1 is reactivated.

After method step S3 or method step S4, the method 100 is continued or ended with method step S1. It can be provided, for example, that the method 100 is executed only once per activation of the active parking assistance system 1, i.e., once per actively assisted parking operation. Alternatively, it may be provided that the method 100 is carried out continuously while the active parking assistance system 1 is activated.

Figure 2:
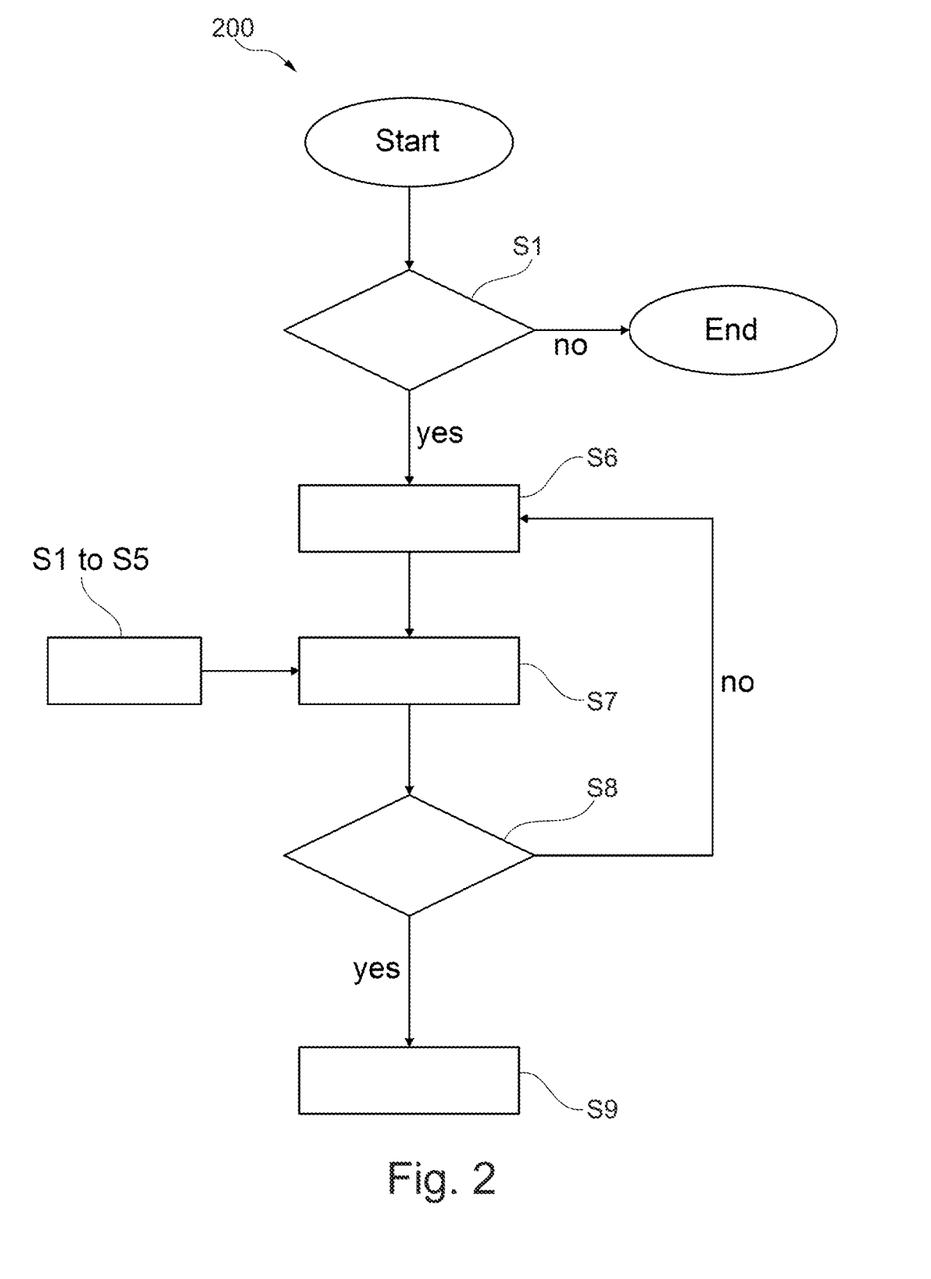
FIG. 2 shows a flow chart of an exemplary method for actively assisting a parking operation.

In FIG. 2, the sequence of an exemplary method 200 for actively assisting a parking operation of a vehicle 300 is shown schematically.

After the start of the method 200, the method step S1 is carried out, in which it is checked whether an active parking assistance system 1 of the vehicle 300 is activated. If this is not the case, the method 200 ends. Otherwise, the method 200 continues to method step S6.

In method step S6, the parking operation, e.g., a parking or unparking maneuver, is actively assisted. For this purpose, a movement path for the parking operation is first determined, along which the vehicle 300 is to move. The vehicle 300 is then moved along this movement path automatically by the active parking assistance system 1 intervening in the steering system of the vehicle 300, accelerating and braking the vehicle 300, and, if necessary, changing gear.

During active assistance of the parking operation, an actual torque 9 acting on the steering handle 2 of the vehicle 300 is determined in method step S7, for example on the basis of a sensor signal from a torque sensor 6 that is operatively connected to the steering handle 2. Subsequently, a check is performed in method step S8 to ascertain whether the determined actual torque 9 exceeds a predetermined threshold torque 11, 14.

If this is the case, active assistance of the parking operation is aborted in method step S9. If, on the other hand, the actual torque 9 does not exceed the threshold torque 11, 14, active assistance of the parking operation is continued according to method step S6.

The described method 200 is characterized in that, in addition to method step S7 in which the actual torque 9 acting on the steering handle 2 is determined, a method 100 for preventing unwanted deactivation of the active parking assistance system 1 is carried out. In the exemplary embodiment, this method 100 comprises the method steps S1 to S5 as explained in greater detail above with reference to FIG. 1, to which reference is made. As a result, for example, if a deactivation prevention event occurs, the threshold torque 10 can be temporarily increased. Unwanted deactivation of the active parking assistance system 1 can thus be avoided.

FIG. 3 shows an exemplary vehicle 300 with an active parking assistance system 1 in a schematic representation. The active parking assistance system 1 has a steering handle 2, which in the exemplary embodiment is designed as a steering wheel. The steering handle 2 is operatively connected to the wheels of the vehicle 300, so that the position of the wheels can be changed in accordance with a steering angle of the steering handle 2. Such a change in position allows a movement path of a parking operation to be completed.

Furthermore, the active parking assistance system 1 has a processing unit 3 which is designed and set up to process signals, such as sensor signals, and thereby check whether the active parking assistance system 1 is activated, whether a deactivation prevention event is present, and whether the driver's attention is sufficient. For this purpose, the processing unit 3 is operatively connected, for signal exchange, to an environment sensor 7, three vehicle sensors 8a, 8b, 8c, and a torque sensor 6.

In the exemplary embodiment, the environment sensor 7 is designed as an ultrasonic sensor and is used to detect the presence of a curb in the vehicle environment. The first vehicle sensor 8a is designed as an inclination sensor and is used to determine the inclination of the vehicle. The second vehicle sensor 8b is designed as a steering angle sensor and is used to determine the steering angle of the steering handle 2. The third vehicle sensor 8c is configured as a camera sensor and observes the eyes of the driver, so that the processing unit 3 can determine whether the attention of the driver of the vehicle 300 is sufficient based on the sensor signal from the camera sensor 8.

The torque sensor 6 is operatively connected to the steering handle 2 so that the torque acting on the steering handle 2 can be determined. This torque can be transmitted as an actual torque 9 to the processing unit 3 and used by the latter to check for the presence of a deactivation prevention event. Furthermore, the processing unit 3 is designed and set up to either determine or otherwise obtain a target torque 12 to be applied to the steering handle 2 and to use it for checking the presence of a deactivation prevention event.

Furthermore, the active parking assistance system 1 has a memory unit 5 in which a moment of inertia 11 of the steering handle 2 and a threshold torque 10 above which the active parking assistance system 1 is deactivated are stored. The moment of inertia 11 can be transmitted to the processing unit 3 and used by the processing unit 3 for checking whether a deactivation prevention event is present.

Alternatively or additionally, the processing unit 3 may be designed and set up to check for the presence of a deactivation prevention event based on a vehicle inclination determined by means of the first vehicle sensor 8a, a steering angle determined by means of the second vehicle sensor 8b, and the presence of a curb determined by means of the environment sensor 7.

If it is determined by means of the processing unit 3 that a deactivation prevention event is present, an increased threshold torque 14 can be defined at least temporarily and transmitted to the memory unit 5. In this case, the threshold torque 10 stored in the memory unit 5 is replaced by the threshold torque 14 increased with respect to the stored threshold torque 10. For example, after a certain period of time or when the active parking assistance system 1 is activated again, the increased threshold torque 14 can be replaced again by the original threshold torque 10.

The threshold torque 10 or, if the presence of a deactivation prevention event was previously determined, the increased threshold torque 14 are transmitted to a control unit 4. The actual torque 9 is likewise transmitted to the control unit 4, so that the control unit 4 can check whether the actual torque 9 exceeds the threshold torque 10 or the increased threshold torque 14. If this is the case, a control signal 13 is output by the control unit 4, which causes the active parking assistance system 1 to be deactivated.

Optionally, the processing unit 3 and the control unit 4 may form a common processing and control unit. By means of the vehicle 300 described with reference to FIG. 3, for example, one of the methods 100, 200 explained with reference to FIGS. 1 and 2 may be carried out.

LIST OF REFERENCE SIGNS 1 active parking assistance system
2 steering handle
3 processing unit
4 control unit
5 memory unit
6 torque sensor
7 environment sensor
8a, 8b, 8c vehicle sensor
9 actual torque
10 threshold torque
11 moment of inertia
12 target torque 13 control signal
14 increased threshold torque
100 method for preventing unwanted deactivation of an active parking assistance system of a vehicle
200 method for actively assisting a parking operation of a vehicle
300 vehicle
S1 check whether the active parking assistance system of the vehicle is activated
S2 check the presence of a deactivation prevention event
S3 increase a threshold torque of a steering handle of the vehicle above which the active parking assistance system is deactivated
S4 prevent automatic deactivation of the active parking assistance system
S5 maintain the threshold torque
S6 actively assist the parking operation
S7 determine an actual torque acting on a steering handle of the vehicle
S8 compare the actual torque with a predetermined threshold torque
S9 cancel the active assistance of the parking operation

What is claimed is:

1. A method for preventing unwanted deactivation of an active parking assistance system of a vehicle, the method comprising the steps of:
determining if the active parking assistance system of the vehicle is activated to perform a parking maneuver;
if the active parking assistance system of the vehicle is activated, determining if a deactivation prevention event is activated, wherein the presence of the deactivation prevention event being activated is based on a vehicle inclination, a steering angle, or a presence of a curb adjacent the vehicle;
if the deactivation prevention event is activated, automatically increasing a threshold torque above which the parking maneuver is deactivated or activating a prevention of the deactivation of the parking maneuver; and
monitoring a torque at a steering handle of the vehicle during the parking maneuver, and automatically deactivating the parking maneuver if a comparison of the torque with the threshold torque indicates a manual action of a driver at the steering handle and the prevention of the deactivation of the parking maneuver is not activated.

2. The method of claim 1 wherein the presence of the curb is determined based on a vehicle sensor signal or based on a geographic position of the vehicle, and the vehicle inclination is determined based on a vehicle sensor signal or based on a geographic position of the vehicle.

3. The method of claim 1 wherein determining if the deactivation prevention event is activated is comprised of continuously monitoring the torque acting on the steering handle of the vehicle beginning at activation of the active parking assistance system, and wherein the presence of the deactivation prevention event is not detected unless the torque acting on the steering handle of the vehicle has been continuously detected since the active parking assistance system was activated.

4. The method of claim 1 wherein determining if the deactivation prevention event is activated is comprised of determining the torque acting on the steering handle of the vehicle, and wherein the presence of the deactivation prevention event is determined based on a moment of inertia of the steering handle, a target torque acting on the steering handle, and the torque.

5. The method of claim 1 further comprising the steps of:
determining if an attention of a driver of the vehicle corresponds with the parking maneuver; and
if the attention of the driver of the vehicle does not correspond with the parking maneuver, automatically preventing the increase of the threshold torque and prohibiting the activation of the prevention of the deactivation of the parking maneuver.

6. A method for actively assisting a parking maneuver of a vehicle, the method comprising the step of:
determining if an active parking assistance system of the vehicle is activated to perform the parking maneuver;
if the active parking assistance system of the vehicle is activated, automatically actively assisting the parking maneuver;
if the active parking assist system is activated, determining if a deactivation prevention event is activated;
if the deactivation prevention event is activated, automatically increasing a predetermined threshold torque above which the parking maneuver is deactivated or activating a prevention of the deactivation of the parking maneuver, wherein the predetermined threshold torque has an initial value corresponding to a torque resulting from a hand of a driver holding the steering handle;
during active assistance of the parking maneuver, determining an actual torque acting on the steering handle of the vehicle;
determining if the actual torque exceeds the predetermined threshold torque;
if the actual torque exceeds the threshold torque and the prevention of the deactivation of the parking maneuver is not activated, automatically canceling the active assistance of the parking maneuver; and
if the actual torque does not exceed the threshold torque, continuing the active assistance of the parking maneuver.

7. The method of claim 6 wherein the presence of the deactivation prevention event being activated is based on a vehicle inclination, a steering angle, or a presence of a curb adjacent the vehicle.

8. The method of claim 7 wherein the presence of the curb is determined based on a vehicle sensor signal or based on a geographic position of the vehicle, and the vehicle inclination is determined based on a vehicle sensor signal or based on a geographic position of the vehicle.

9. The method of claim 6 wherein determining if the deactivation prevention event is activated is comprised of continuously monitoring the actual torque acting on the steering handle of the vehicle beginning at activation of the active parking assistance system, and wherein the presence of the deactivation prevention event is not detected unless the actual torque acting on the steering handle of the vehicle has been continuously detected since the active parking assistance system was activated.

10. The method of claim 6 wherein determining if the deactivation prevention event is activated is comprised of determining the actual torque acting on the steering handle of the vehicle, and wherein the presence of the deactivation prevention event is determined based on a moment of inertia of the steering handle, a target torque acting on the steering handle, and the actual torque.

11. The method of claim 6 further comprising the steps of:
determining if an attention of a driver of the vehicle corresponds with the parking maneuver; and
if the attention of the driver of the vehicle does not correspond with the parking maneuver, preventing the increase of the predetermined threshold torque and prohibiting the activation of the prevention of the deactivation of the parking maneuver.

12. An active parking assistance system for a vehicle, comprising:
a steering handle;
a torque sensor coupled to the steering handle sensing an actual torque applied to the steering handle;
a vehicle sensor configured for sensing a deactivation prevention event; and
a controller configured to:
determine if the active parking assistance system of the vehicle is activated to perform a parking maneuver;
if the active parking assistance system of the vehicle is activated, determining if a deactivation prevention event is activated, wherein determining if the deactivation prevention event is activated is comprised of determining the actual torque acting on the steering handle of the vehicle, and wherein the presence of the deactivation prevention event is determined based on a moment of inertia of the steering handle, a target torque acting on the steering handle, and the actual torque;
if a deactivation prevention event is activated, increasing a threshold torque above which the parking maneuver is deactivated or activating a prevention of the deactivation of the parking maneuver; and
monitor the actual torque at the steering handle of the vehicle during the parking maneuver, and automatically deactivating the parking maneuver if a comparison of the actual torque with the threshold torque indicates a manual action of the driver at the steering handle and the prevention of the deactivation of the parking maneuver is not activated.

13. The active parking assistance system of claim 12 wherein the vehicle sensor is comprised of an inclination sensor, a steering angle sensor, or an imaging sensor, and wherein the presence of the deactivation prevention event being activated is based on a vehicle inclination, a steering angle, or a presence of a curb adjacent the vehicle.

14. The active parking assistance system of claim 12 wherein the vehicle sensor is comprised of a navigation system, and wherein the presence of a curb is determined based on a geographic position of the vehicle, and wherein a vehicle inclination is based on a geographic position of the vehicle.

15. The active parking assistance system of claim 12 wherein determining if the deactivation prevention event is activated is comprised of continuously monitoring the actual torque acting on the steering handle of the vehicle beginning at activation of the active parking assistance system, and wherein the presence of the deactivation prevention event is not detected unless an actual torque acting on the steering handle of the vehicle has been continuously detected since the active parking assistance system was activated.

16. The active parking assistance system of claim 12 wherein the controller is further configured to:
determining if an attention of a driver of the vehicle corresponds with the parking maneuver; and
if the attention of the driver of the vehicle does not correspond with the parking maneuver, prevent the increase of the threshold torque and preventing the activation of the prevention of the deactivation of the parking maneuver.

* * * * *